United States Patent [19]
Corriveau

[11] Patent Number: 5,280,861
[45] Date of Patent: Jan. 25, 1994

[54] SPOOL ASSEMBLY FOR PINTLE

[75] Inventor: André Corriveau, Rock Forest, Canada

[73] Assignee: Lippert Pintlepin Mfg. Inc., Rock Forest, Canada

[21] Appl. No.: 981,210

[22] Filed: Nov. 25, 1992

[51] Int. Cl.$^5$ ............................................. B65H 75/40
[52] U.S. Cl. ......................................... 242/85; 242/96
[58] Field of Search .................... 242/84.8, 85, 85.1, 242/96, 99, 100, 100.1, 104, 129, 129.5, 130, 131, 132, 136, 137, 137.1

[56] References Cited

U.S. PATENT DOCUMENTS

| | | | |
|---|---|---|---|
| 3,424,435 | 1/1969 | Niemann | 242/84.8 |
| 3,686,767 | 8/1972 | Duda et al. | 242/84.8 X |
| 3,765,618 | 10/1973 | Johnson et al. | 242/99 X |
| 4,036,451 | 7/1977 | Pipkin | 242/137.1 |
| 4,056,235 | 11/1977 | Roe et al. | 242/84.8 X |
| 4,553,715 | 11/1985 | Roselli | 242/100 |
| 4,715,549 | 12/1987 | Travlos | 242/129 X |
| 4,730,783 | 3/1988 | Lamson | 242/84.8 |
| 4,842,212 | 6/1989 | Loiselle et al. | 242/96 |
| 4,913,369 | 4/1990 | Lia et al. | 242/96 |
| 5,033,618 | 7/1991 | Edens, Jr. et al. | 242/134 |
| 5,106,056 | 4/1992 | Crates et al. | 242/96 X |

FOREIGN PATENT DOCUMENTS 2163128  2/1986  United Kingdom ............... 242/100

Primary Examiner—Daniel P. Stodola
Assistant Examiner—John P. Darling
Attorney, Agent, or Firm—Robic

[57] ABSTRACT

A spool assembly for pintle or other kind of cables, which is simple and efficient in use and is advantageously made of a very small number of standardized elements that can be assembled in a plurality of ways to meet any specific requirements, such as, for example, the need for a handle, the need for having a pair of spools immediately available to the user, or the need for a stopper to rigidly hold the external end of the pintle. The assembly has one or two cylindrical spool in which pintles may be wound. It also has one or two cylindrical spool receiving members having a cylindrical peripheral wall, a flange preferably in the form of a ring projecting radially inwardly from one of the edges of the peripheral wall to hold the spool, a plurality of hooks integral to and projecting from the other edge of the peripheral wall at given intervals, and an opening provided in the peripheral wall to allow the cable wound in the groove of the spool to be pulled out. The assembly further has a flat, preferably ring-shaped circular cover having an external diameter that can be engaged by the hooks and held tight by these hooks against the other edge of the spool receiving member, to form therewith a casing in which each spool is freely mounted.

21 Claims, 3 Drawing Sheets

SPOOL ASSEMBLY FOR PINTLE

BACKGROUND OF THE INVENTION a) Field of the Invention

The present invention relates to a spool assembly for use in storing and handling a cable-like member which is preferably but not necessarily a pintle.

b) Brief Description of the Prior Art

In the paper making industry, it is of common practice to use fabric belts that are made of sections connected to each other to form an endless loop. Such belts carry the wet fibrous sheets that are prepared from the processed pulp. It is also of common practice to connect the adjacent ends of the belt sections by means of seams made by passing a cable known in the trade as a "pintle" through a tubular passage formed by intermeshed loops of fabric yarns projecting at the ends of the adjacent sections when the same are interfitted and held together. Usually, the pintle consists of a mono- or multifilament yarn whose leading end is attached to a stiff guiding wire made of metal, which acts as a needle to facilitate insertion of the yarn into the passage formed by the loops.

Further details regarding the use of pintles to connect fabric belt sections, can be found to the preambles of U.S. Pat. Nos. 4,842,212 to ASTEN GROUP, INC. and 5,033,618 to ALBANY INTERNATIONAL CORP.

Of course, it is necessary that the pintle be stored and made available in such a manner as to make its use and installation as fast and easy as possible, especially in the case of replacement of used or damaged sections of the endless belt of a paper making machine, which must be made in a very fast manner on the premises.

Spool assemblies for pintles have already been devised to tentatively meet the above mentioned requirement. In this connection, reference can be made again to the above mentioned patents, which are both directed to such assemblies.

OBJECT AND SUMMARY OF THE INVENTION

The object of the present invention is to provide a spool assembly for pintle, or other kind of cables which is as simple and efficient in use as the existing assemblies known to the Applicant, and is advantageously made of a very small number of standardized elements that can be assembled in a plurality of ways to meet any specific requirements, such as, for example, the need for a handle, the need for having a pair of spools immediately available to the user, or the need for a "stopper" to rigidly hold the external end of the pintle.

In accordance with the invention, this object is achieved with a spool assembly for storing and handling a cable-like member, preferably a pintle, comprising:

a) a cylindrical spool formed with a radially outwardly opening groove in which the cable-like member may wound, the spool having a given outer diameter and a given thickness;

b) a cylindrical spool receiving member having a central axis and comprising:

a cylindrical peripheral wall having a pair of opposite edges that are round in shape, the peripheral wall also having an outer diameter, an inner diameter that is substantially equal to or slightly larger than the outer diameter of the spool, and a height that is substantially equal to or slightly larger than the thickness of the spool;

a flange preferably in the form of a ring projecting radially inwardly from one of the round edges of the peripheral wall to hold the spool within the spool receiving member when the spool is coaxially inserted therein through the other one of the round edges;

hooking means integral to and projecting from the other edge of the peripheral wall at given intervals along this other edge and in a direction parallel to the direction of the central axis of the spool receiving member; and an opening provided in the peripheral wall to allow the cable wound in the groove of the spool to be pulled out; and c) a flat, preferably ring-shaped circular cover having an external diameter sufficient for said cover to be engaged by the hooking means and held tight by these hooking means against the other edge of the spool receiving member, to form therewith a casing in which the spool is freely mounted.

In accordance with a preferred embodiment of the invention, the spool assembly may also comprise an external locking tab integral to the spool receiving member, the tab extending parallel to the peripheral wall of the member close to the opening made in this wall and being devised in such a manner as to receive and rigidly hold any portion of the cable projecting outwardly of the opening.

Alternatively, the spool assembly may comprise:

(e) a stopper snappable onto the casing formed by the spool receiving member and the cover to rigidly hold any portion of the cable projecting outwardly from the casing through the opening, the stopper being L-shaped and sized to fit onto the peripheral wall and the flange of the spool receiving member, the stopper having a hook at one end that is sized and positioned to engage the inner edge of the flange and another hook at another end that is sized and positioned to engage the cover.

In accordance with another preferred embodiment of the invention, the spool assembly may further comprise:

f) another cylindrical spool identical to spool (a); and g) another cylindrical spool receiving member identical to member (b);

whereby, by proper insertion of the other spool (f) into the other member (g) and hooking of this other member (g) containing the spool (f) to the cover opposite the spool receiving member (b), the spool (a) contained in the member (b) and said spool (f) are operatively connected in independent, parallel relationship.

Advantageously, each of the constituting elements of the spool assembly according to the invention is preferably made of plastic material, such as polycarbonate, Nylon ®, polyester, PVC and acrylic.

Preferably also, the cable-like member is a pintle consisting of at least one yarn connected to a stiff guiding pin.

As can be understood, the spool assembly according to the invention comprises a small number of basic elements, namely one or two identical spool(s), a corresponding number of spool receiving members, a cover, one or two identical stopper(s) and a handle that can be assembled by mere hooking. Thus the spool assembly according to the invention is very simple in structure and assembly in addition of being versatile in use.

The invention and its advantages will be better understood from the following description of a preferred embodiment thereof, made with reference to the accompanying drawings.

DESCRIPTION OF A PREFERRED EMBODIMENT OF THE INVENTION

Figure 1:
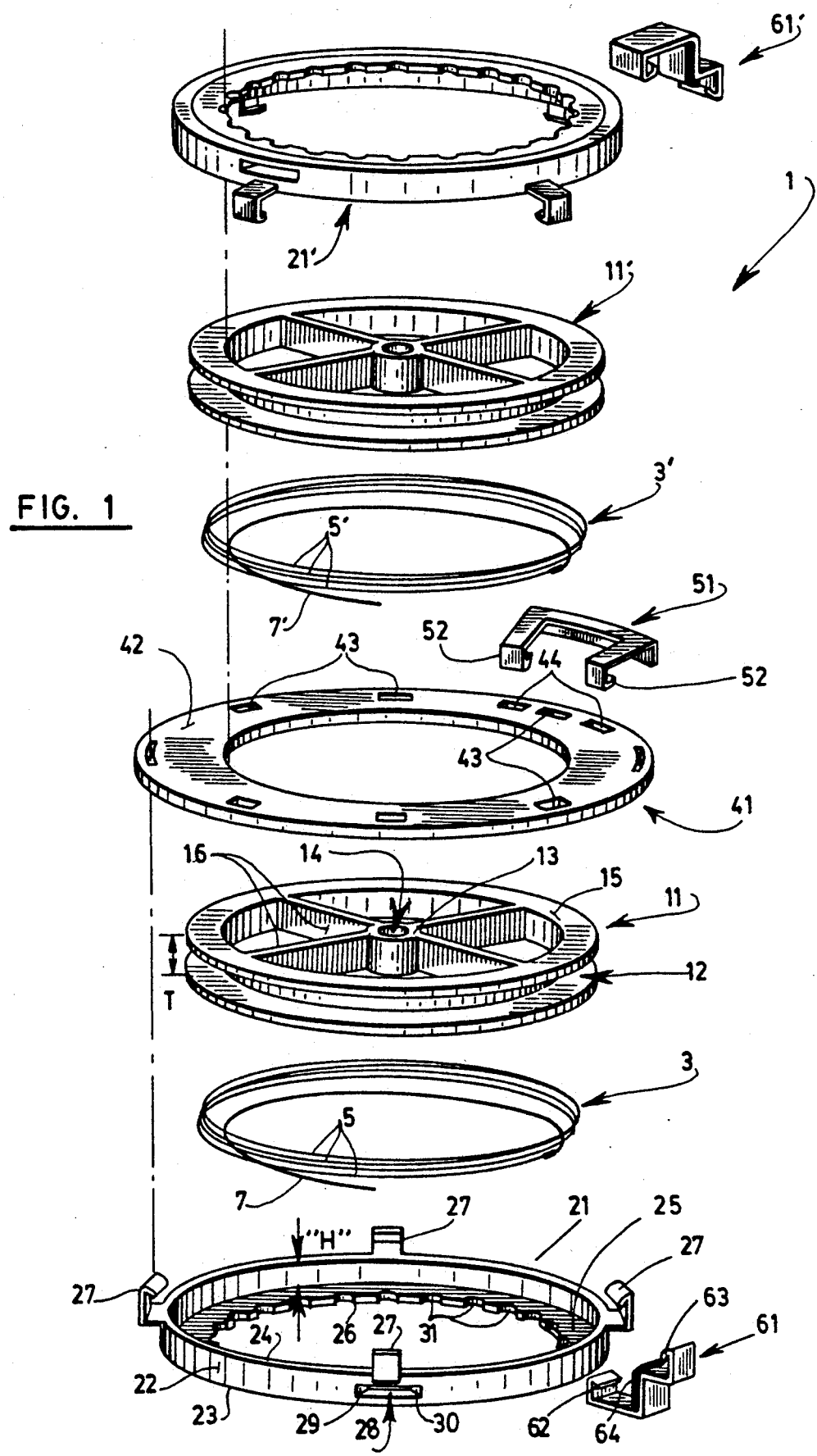
FIG. 1 is an exploded perspective view of a spool assembly according to the invention, including two independent spools mounted in parallel relationship.
Figure 2:
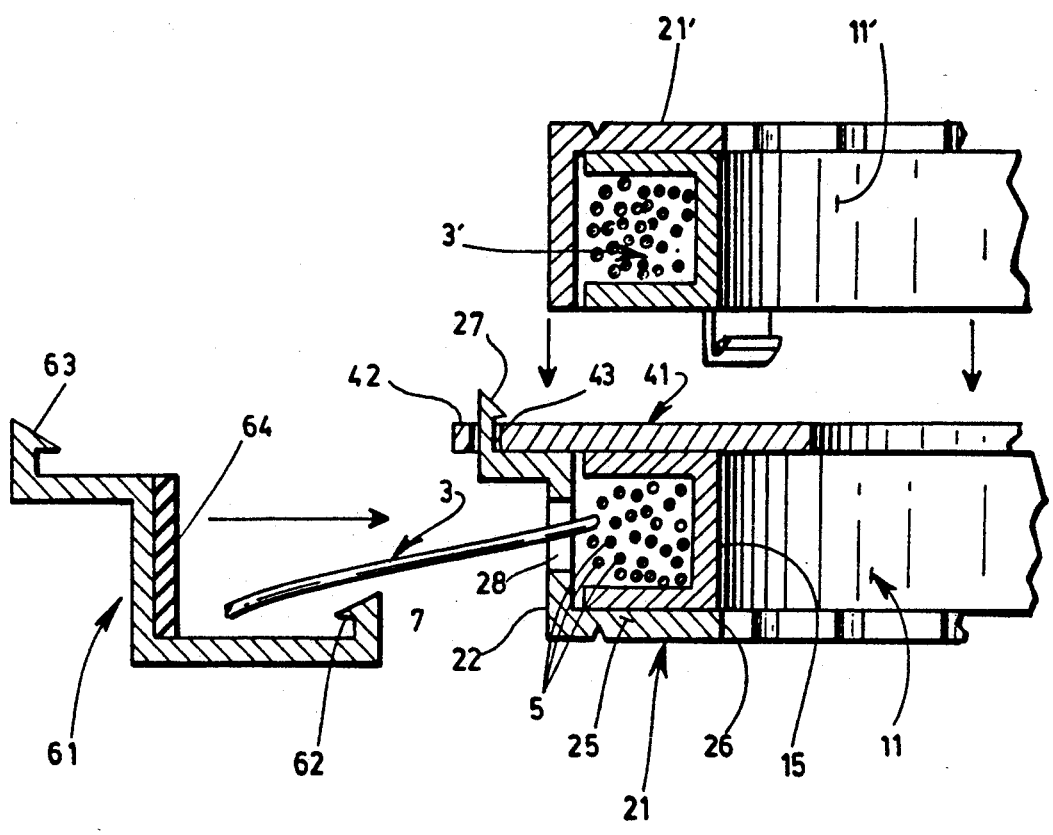
FIG. 2 is a cross-sectional view of one side of the spool assembly showing FIG. 1 in semi-assembled form.

The spool assembly 1 according to the invention as shown in the accompanying drawings is intended to be used for storing and handling at least one and preferably two cable-like members 3, 3' which preferably but not necessarily consist of pintles made of one or more yarns 5,5' connected to a stiff guiding pin 7, 7'.

The spool assembly 1 comprises eight basic elements preferably made of molded plastic material, namely:
a pair of identical spools 11, 11';
a pair of identical spool receiving members 21,21';
a flat cover 41;
a handle 51; and
a pair of identical stoppers 61,61'.

Each spool 11,11' is formed with a radially outwardly opening groove 12 in which the corresponding pintle 3 may be wound. The spool 11 which has a given outer diameter and a given thickness "T", preferably comprises a central hub 13 in which is made a spindle-receiving hole 14, a peripheral ring 15 having a square, U-shaped cross-section that opens radially outwardly and defines the above mentioned groove 12, and a plurality of radial arms 16 joining the central hub 13 to the peripheral ring 15.

Each spool receiving member 21,21' has a central axis which, when the spool assembly is in assembled form, is coaxial with the spindle receiving hole 14 of the corresponding spool 11,11', and comprises a cylindrical peripheral wall 22 having a pair of opposite edges 23,24 that are round in shape. The peripheral wall 22 also has an outer diameter, an inner diameter that is substantially equal to or slightly larger than the outer diameter of the corresponding spool, and a height "H" that is substantially equal to or slightly larger than the thickness "T" of the spool. Each spool receiving member 21,21' also comprises a flange 25 projecting radially inwardly from one of the round edges, say 23, of the peripheral wall 22 to hold the corresponding spool 11,11' when this spool is coaxially inserted therein through the opening defined by the other one of the round edges. Preferably, as is shown, the flange 25 of the spool receiving member is in the form of a flat ring that extends in a plane perpendicular to the central axis of the member. Such a flat ring has an inner edge 26.

Each spool receiving member 21,21' further comprises hooking means integral to and projecting from the edge 24 of the peripheral wall 22 at given intervals along this edge and in a direction parallel to the direction of the central axis of the spool receiving member. These hooking means preferably consist of a plurality of small, slightly resilient hooks 27 that are circumferentially distributed along the edge 24 of the peripheral wall 22 of the spool receiving member, each hook 27 being sized and positioned to engage a hook-receiving slot 43 provided for this purpose in the cover 41 as will be explained hereinafter.

An opening 28 is provided in the peripheral wall 22 to allow the cable 3,3' wound in the groove 12 of the corresponding spool to be pulled out, when the spool is inserted into the member. As is clearly shown in FIG. 1, the opening 28 extends centrally between the edges 23,24 of the peripheral wall 22 of the spool receiving member and is elongated in a direction perpendicular to the central axis of this member. The opening 28 also has a pair of opposite ends 29,30 that taper radially inwardly toward each other.

The flat cover 41 is circular in shape and has an external diameter sufficient to make it engageable by the hooks 27 and held tight by these hooks against the edge 24 of the spool receiving member to form therewith a pair of parallel casings in which the spools 11,11' are freely mounted. As is shown, cover 41 is preferably in the form of a flat ring which extends in plane perpendicular to the central axis of each of the spool receiving members when said members are hooked to it. This feature combined with the ring shape of the flange 25 of each member makes it possible for the spindle-receiving hole 14 of the spools 11,11' to remain accessible and usable even when the spools are mounted in the casings formed by their corresponding spool receiving members 21,21' and their common cover 41.

Preferably, the cover 41 has an external diameter that is larger than the outer diameter of the peripheral wall 22 of each of the spool receiving members 21,21'. As a result, a peripheral portion 42 of the cover projects radially outwardly from the spool receiving members 21,21' when these members are hooked to the cover 41.

The hook receiving holes 43 mentioned hereinabove are made in this peripheral portion 42 at such locations as to be engageable by the hooks 27 projecting from each of the spool receiving member 21,21'. Other hook-receiving holes 44 may be provided in the peripheral portion 42 of the cover to receive hooks 52 projecting from both ends of the handle 51, when such a handle is wanted.

Like the handle 51, the stopper 61,61' are not compulsory and can be used only if desired. each stopper 61,61' is devised to be snapped onto one of the casings formed by the spool receiving members 21,21' and the cover 41 to rigidly hold any portion of the cable projecting outwardly from this casing through the corresponding opening 28. As is shown, each stopper is L-shaped and sized to fit onto the peripheral wall 22 and the flange 25 of one of the spool receiving members. For this purpose, each stopper has a hook 62 at one end that is sized and positioned to engage the inner edge 26 of the flange 25 and another hook 63 at another end that is sized and positioned to engage the outer edge of the cover 41. Notches 31 may be provided along the inner edge 26 of the flange 25 to prevent the stopper from inadvertently rotating about the corresponding casing. A padding 64 may be provided on the arm of the stopper that is adjacent the peripheral wall 22 in use, to give room and retain the cable 3.

As can be understood, when only one cable-like member 3 is wanted, the spool assembly can be made of one of the spools, say 11; one of the spool receiving members, say 21, and the cover 41 exclusively, with or without the handle 51 and/or one of the stopper.

Figure 3:
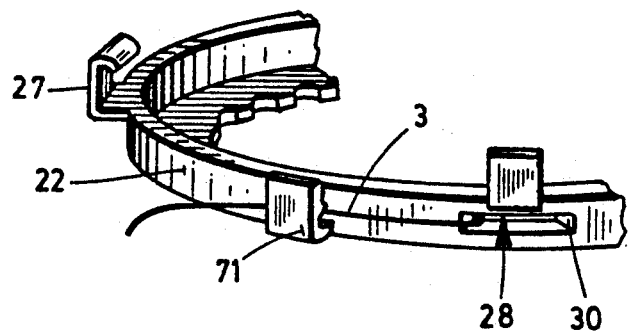
FIG. 3 is a perspective view of a portion of a spool receiving member for use in a spool assembly according to the invention, the member including a locking tab to hold the cable projecting out of the spool.

Instead of incorporating one or two stopper 61, 61' as disclosed hereinabove, the spool assembly 1 according to the invention may include spool receiving members 21, 21' on which a locking tab 71 is integrally molded, as is shown in FIG. 3. The tab 71 extends outwardly of and parallel to the peripheral wall 22 of the receiving member at a short distance from the opening 28 and is positioned and shaped in such a manner as to receive and rigidly hold by pinching the cable 3 that projects out of the opening 28.

What is claimed is:

1. A spool assembly for storing and handling a cable member, comprising:
   a) a cylindrical spool formed with a radially outwardly opening groove in which said cable member may be wound, said spool having a given outer diameter and a given thickness;
   b) a cylindrical spool receiving member having a central axis and comprising:
      a cylindrical peripheral wall having a pair of opposite edges that are round in shape, said peripheral wall also having an outer diameter, an inner diameter that is slightly larger than the outer diameter of the spool, and a height that is slightly larger than the thickness of said spool;
      a flange projecting radially inwardly from one of the round edges of the peripheral wall to hold the spool within said spool receiving member when the spool is coaxially inserted therein through the other one of said edges, said flange being in the form of a flat ring that extends in a plane perpendicular to the central axis of said member, said flat ring having an inner edge;
      hooking means integral to and projecting from said other edge of said peripheral wall at given intervals along said other edge and in a direction parallel to the direction of the central axis of said spool receiving member; and
      an opening provided in said peripheral wall to allow the cable member wound in the groove of the spool to be pulled out; and
   c) a flat circular cover having an external diameter sufficient for said cover to be engaged by the hooking means and held tight by said hooking means against the other edge of the spool receiving member to form therewith a casing in which the spool is freely mounted, said cover being in the form of a flat ring which extends in another plane perpendicular to the central axis of the spool receiving member when said cover is hooked to said member, wherein:
      said hooking means consist of a plurality of small, resilient hooks that are circumferentially distributed along the other edge of the peripheral wall of the spool receiving member, each of said hooks engaging a hook-receiving slot made in said cover;
      said cover has an external diameter larger than the outer diameter of the peripheral wall of the spool receiving member, whereby a peripheral portion of said cover projects radially outwardly from the spool-receiving member when said cover is hooked to said member; and
      said spool assembly further comprises (d) a handle that can be hooked into slots made in said peripheral portion of said cover.

2. The spool assembly of claim 1, wherein:
   said cylindrical spool is flat and comprises a central, spindle-receiving hole that is coaxial with the central axis of the spool receiving member when said spool is inserted in said member; whereby said spindle-receiving hole remains accessible and usable even when the spool is mounted in the casing formed by said spool receiving member and cover.

3. The spool assembly of claim 2, wherein:
   said spool comprises a central hub in which is made said spindle-receiving hole, a peripheral ring having a square, U-shaped cross-section that opens radially outwardly and defines said groove; and a plurality of radial arms joining said central hub to said peripheral ring.

4. The spool assembly of claim 2, wherein:
   said opening extends centrally between the edges of the peripheral wall of the spool receiving member and is elongated in a direction perpendicular to said central axis, said opening having a pair of opposite ends that taper radially inwardly toward each other;
   said spool comprises a central hub in which is made said spindle-receiving hole, a peripheral ring having a square, U-shaped cross-section that opens radially outwardly and defines said groove; and a plurality of radial arms joining said central hub to said peripheral ring;
   said spool assembly further comprises (e) a stopper snappable onto the casing formed by said spool receiving member and cover to rigidly hold an adjacent portion of said cable projecting outwardly from said casing through said opening, said stopper being L-shaped and fit onto the peripheral wall and the flange of said spool receiving member, said stopper having a hook at one end that engages the inner edge of said flange and another hook at another end that engages said cover.

5. The spool assembly of claim 4, further comprising:
   f) another cylindrical spool identical to spool (a); and
   g) another cylindrical spool receiving member identical to member (b);
   whereby, by insertion of said another spool (f) into said another member (b), said spool (a) contained in said member (b) and said spool (f) are operatively connected in independent, parallel relationship.

6. The spool assembly of claim 2, further comprising:
   f) another cylindrical spool identical to spool (a); and
   g) another cylindrical spool receiving member identical to member (b);
   whereby, by insertion of said another spool (f) into said another member (g) containing the spool (f) to said cover opposite said spool receiving member (b), said spool (a) contained in said member (b) and said spool (f) are operatively connected in independent, parallel relationship.

7. The spool assembly of claim 2, wherein each of the elements of said assembly is made of plastic material.

8. The spool assembly of claim 1, wherein:
   said opening extends centrally between the edges of the peripheral wall of the spool receiving member and is elongated in a direction perpendicular to said central axis, said opening having a pair of opposite ends that taper radially inwardly toward each other.

9. The spool assembly of claim 1, wherein the spool receiving member (b) also comprises an external locking tab integral and parallel to the peripheral wall of said spool receiving member, said tab extending close to the opening and receiving and holding by pinching the cable projecting outwardly from the casing through said opening.

10. The spool assembly of claim 9, further comprising:
f) another cylindrical spool identical to spool (a); and
g) another cylindrical spool receiving member identical to member (b);
whereby, by insertion of said another spool (f) into said another member (b); said spool (a) contained in said member (b) and said spool (f) are operatively connected in independent, parallel relationship.

11. The spool assembly of claim 9, wherein each of the elements of said assembly is made of plastic material.

12. The spool assembly of claim 1, further comprising:
f) another cylindrical spool identical to spool (a); and
g) another cylindrical spool receiving member identical to member (b);
whereby, by insertion of said another spool (f) into said another member (b), said spool (a) contained in said member (b) and said spool (f) are operatively connected in independent, parallel relationship.

13. The spool assembly of claim 12, wherein each of the elements of said assembly is made of plastic material.

14. The spool assembly of claim 12, wherein said cable member is a pintle consisting of at least one yarn connected to a stiff guiding pin.

15. The spool assembly of claim 1, wherein each of the elements of said assembly is made of plastic material.

16. The spool assembly of claim 1, wherein said cable member is a pintle consisting of at least one yarn connected to a stiff guiding pin.

17. The spool assembly of claim 1, further comprising:
(e) a stopper snappable onto the casing formed by said spool receiving member and cover to rigidly hold any an adjacent portion of said cable projecting outwardly from said casing through said opening, said stopper being L-shaped and sized to fit onto the peripheral wall and the flange of said spool receiving member, said stopper having a hook at one end that engages the inner edge of said flange and another hook at another end that engages said cover.

18. A spool assembly, for storing and handling a cable member, comprising:
a) a cylindrical spool formed with a radially outwardly opening groove in which said cable member may be wound, said spool having a given outer diameter and a given thickness;
b) a cylindrical spool receiving member having a central axis and comprising:
a cylindrical peripheral wall having a pair of opposite edges that are round in shape, said peripheral wall also having an outer diameter, an inner diameter that is slightly larger than the outer diameter of the spool, and a height that is slightly larger than the thickness of said spool;
a flange projecting radially inwardly from one of the round edges of the peripheral wall to hold the spool within said spool receiving member when the spool is coaxially inserted therein through the other one of said edges, said flange being in the form of a flat ring that extends in a plane perpendicular to the central axis of said member, said flat ring having an inner edge;
hooking means integral to and projecting from said other edge of said peripheral wall at given intervals along said other edge and in a direction parallel to the direction of the central axis of said spool receiving member; and
an opening provided in said peripheral wall to allow the cable member wound in the groove of the spool to be pulled out; and
c) a flat circular cover having an external diameter sufficient for said cover to be engaged by the hooking meaning and held tight by said hooking means against the other edge of the spool receiving member to form therewith a casing in which the spool is freely mounted, said over being in the form of a flat ring which extends in another plane perpendicular to the central axis of the spool receiving member, wherein said spool assembly further comprises:
(e) a stopper snappable onto the casing formed by said spool receiving member and cover to rigidly hold an adjacent portion of said cable projecting outwardly from said casing through said opening, said stopper being L-shaped and fit onto the peripheral wall and the flange of said spool receiving member, said stopper having a hook at one end that engages the inner edge of said flange and another hook at another end that engages said cover.

19. The spool assembly of claim 18, further comprising:
f) another cylindrical spool identical to spool (a); and
g) another cylindrical spool receiving member identical to member (b);
whereby, by insertion of said another spool (f) into said another member (b), said spool (a) contained in said member (b) and said spool (f) are operatively connected in independent, parallel relationship.

20. The spool assembly of claim 18, wherein each of the elements of said assembly is made of plastic material.

21. The spool assembly of claim 18, wherein said cable member is a pintle consisting of at least one yarn connected to a stiff guiding pin.

* * * * *